C. J. WILDER.
MACHINE FOR WEIGHING LIQUIDS.
APPLICATION FILED DEC. 26, 1911.
1,024,874.
Patented Apr. 30, 1912.
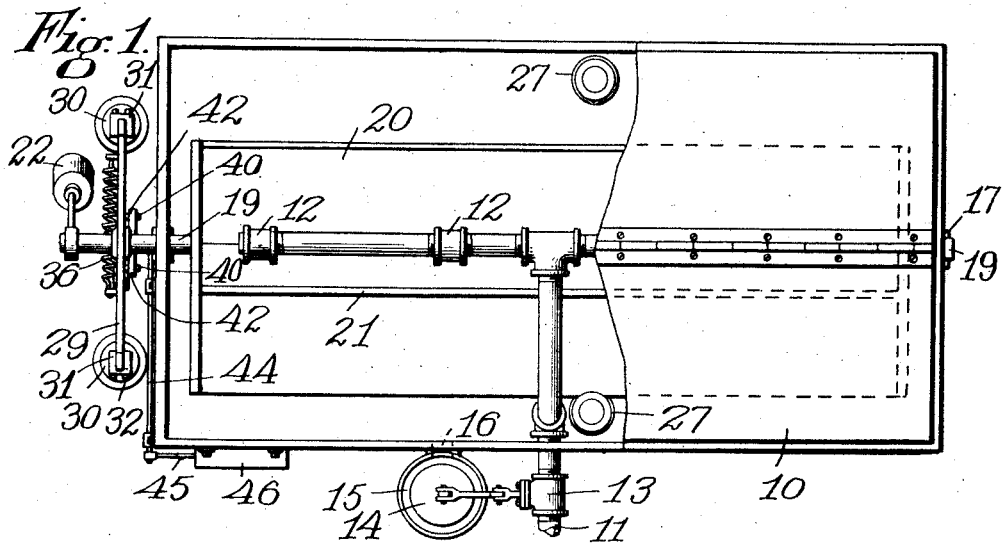
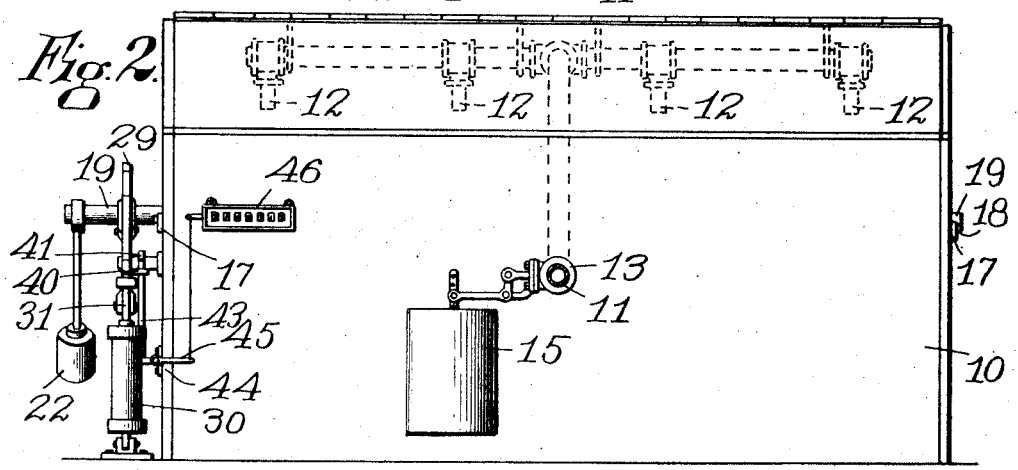
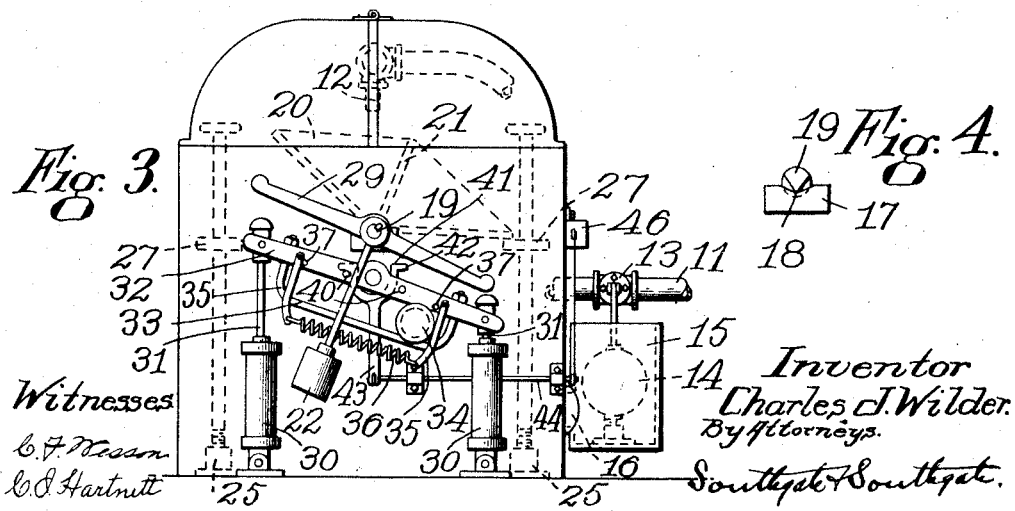
Witnesses
C. F. Wesson
C. S. Hartnett
Inventor
Charles J. Wilder.
By Attorneys
Southgate & Southgate.
COLUMBIA PLANOGRAPH CO., WASHINGTON, D. C.

UNITED STATES PATENT OFFICE.

CHARLES J. WILDER, OF AUBURN, MASSACHUSETTS.

MACHINE FOR WEIGHING LIQUIDS.

1,024,874. Specification of Letters Patent. Patented Apr. 30, 1912.

Application filed December 26, 1911. Serial No. 667,629.

*To all whom it may concern:*

Be it known that I, CHARLES J. WILDER, a citizen of the United States, residing at Auburn, in the county of Worcester and State of Massachusetts, have invented a new and useful Machine for Weighing Liquids, of which the following is a specification.

While this invention is designed particularly for automatically weighing feed water for boilers in making evaporative tests, it is capable of general use for weighing any free flowing liquid.

The principal objects of the invention are to provide for the extremely accurate weighing which is required in feed water tests; and to provide a construction which when once set into operation properly will continue to operate accurately and effectively without attention.

Further objects and advantages of the invention will appear in the course of the following description.

Reference is to be had to the accompanying drawings, in which—

Figure 1 is a plan of a tank and weigher constructed in accordance with this invention; Fig. 2 is a side elevation; Fig. 3 is an end view and Fig. 4 is a detail of the support for one end of the main shaft.

The machine is shown as applied to an ordinary tank 10 of wood or metal. This tank may be open or closed but it is not closed air tight as it must be at atmospheric pressure. The tank is shown as provided with a feed pipe 11 extending up into the top thereof and having discharge openings 12 at the center. This feed pipe is controlled by a valve 13 which in turn is controlled by a float 14 shown in the chamber 15 in communication through a port 16 with the interior of the tank. It will be obvious therefore that when the liquid in the tank is below a predetermined level the float will keep the valve 13 open and will close it accurately whenever the liquid in the tank gets above that level. In boxes 17 at the ends of the tank are knife edges 18 upon which rests a shaft 19. On this shaft is fixed a two-part trough or hopper 20 having a central partition 21. This hopper is intended to oscillate on the knife edges back and forth so that the partition 21 will come alternately at opposite sides of the outlets 12. Obviously the discharge of water into the hopper will fill the uppermost half thereof until it overbalances the other half and the counter-weight 22 on the shaft, and then it will tip into the opposite position. Mounted in screw-threaded feet 25 at the bottom of the tank are adjusting stops 27 for the edges of the hopper. In this way the stops can be adjusted to the desired height to produce accurate operation. It will be understood, of course, that they are never adjusted to a height above the shaft 19 so that the liquid in the lower half of the hopper can always be discharged.

Fixed on the shaft 19 is a lever 29 extending in opposite directions from the shaft and movable with the hopper. Located at the end of the hopper are retarding devices 30 shown in the form of dash-pots, each having a plunger 31. These plungers are in position to be engaged by the ends of the lever 29 and depressed alternately as the hopper oscillates. They serve to prevent the hopper from receiving any shock as it reciprocates between the stops 27. In order that there may be no unnecessary friction, these dash-pot plungers are not connected directly with the hopper, but are operated simply by contact with the rocker arm 29 at each end of the stroke. In order further to prevent friction and for another purpose that will be described hereinafter, the two dash-pot plungers are connected by a lever or dash pot arm 32 which is pivoted at the center directly under the shaft 19. On this lever is a track 33 on which operates a grooved roller weight 34. At the ends of its stroke this weight is checked by a pair of pivoted arms 35 connected by a spring 36 and stopped at their limiting positions by pins 37. With this construction it will be seen that when the arm 29 has pushed a dash-pot plunger down it causes the arm or lever 32 to reverse its position and thereby sets the roller 34 to rolling down the incline until it strikes its arm 35. When it strikes the arm it forces it away from its stop and pulls the other arm through the spring 36 against its pin 37. This cushions the roller and also forces the lower dash pot plunger downwardly away from the end of the lever 29.

In order that the oscillations of the hopper may be registered accurately the lever 32 is provided with a pair of pins 40 and a yoke 41 is provided having fingers 42 extending outwardly from opposite sides thereof over the pins. This yoke is connected with a rod 43 on a shaft 44 which has another arm 45 connected with an ordinary counting mechanism 46. In this way it will be seen that every time the roller moves down it positively forces up one of the pins and causes the counter to register. The weight of the yoke moves it down between operations of course.

The operation of the device will be understood readily from what has been said. Water is admitted under pressure to the pipe 11 passing through the valve and thence to the outlet 12. Preferably it discharges through a series of short pipes or spouts 12 to deliver the water into either side of the hopper. The hopper over-balances after it has received a certain definite weight and tips over into contact with one of the stops 27 and spills its contents into the tank. It can be adjusted to hold any desired amount as will be obvious. As it swings over it takes with it the arm 29 which comes into contact with the elevated plunger 31 and depresses it. As this plunger goes down it swings the lever 32, thus lifting the weight 34 until the incline of the track 33 is reversed. Then the weight slides down the incline into contact with its stop and swings the lowered plunger 31 away from the end of the arm 29. At the same time the pin 40 that is elevated by this action comes into contact with the yoke and registers one operation or measure of water on the counter.

It has been found in practice that this machine is extremely accurate in operation, is durable, and requires practically no attention.

Although I have illustrated and described a preferred embodiment of the invention I am aware that many modifications can be made therein by any person skilled in the art without departing from the scope of the invention as expressed in the claims. Therefore I do not wish to be limited to all the details of construction herein shown and described, but What I do claim is:—

1. In a machine for weighing liquids, the combination with a tank, of a swinging hopper mounted therein for receiving liquid and discharging it into the tank as the hopper swings back and forth, a lever movable with the hopper, and a dash pot having a plunger projecting therefrom into position to be engaged by said lever as the hopper swings to one of its limiting positions, said lever being independent of said plunger, whereby it will not retard the return motion of the hopper.

2. In a machine for weighing liquids, the combination with a tank, of a swinging hopper for receiving liquid and discharging it into the tank, means for retarding the swinging motion of the hopper during the last part of its motion in one direction, and means movable with the hopper in position to engage and operate said retarding means as the hopper swings, said means movable with the hopper being independent of said retarding means, so that the return motion of the hopper will not be retarded thereby.

3. In a machine for weighing liquids, the combination with a tank, of a two-part pivoted hopper for receiving liquid discharged therein and discharging the liquid into the tank, a pair of vertically adjustable positive stops for opposite sides of the hopper, means for retarding the swinging motion of the hopper on its pivot during the last part of said motion, and a lever movable with the hopper in position to engage and operate said retarding means alternately as the hopper swings, said lever being independent of said retarding means, whereby the return motion of the hopper will not be retarded thereby.

4. In a machine for weighing liquids, the combination with a tank, of a two-part hopper pivotally mounted therein for receiving liquid and discharging it into the tank, a lever fixed with respect to said hopper and projecting on opposite sides of the pivot thereof, a pair of dash-pots, and plungers projecting upwardly therefrom into position to be engaged by said lever as the hopper swings, said lever being independent of said plungers, whereby the return motion of the hopper will not be retarded thereby.

5. In a machine for weighing liquids, the combination with a tank, of a two-part hopper pivotally mounted therein for receiving liquid and discharging it into the tank, a lever fixed with respect to said hopper and projecting on opposite sides of the pivot thereof, a pair of dash-pots having plungers projecting upwardly therefrom into position to be engaged by said lever as the hopper swings, said lever being independent of said plungers, a second lever below the first named lever connected with said dash-pot plungers for raising one when the other is lowered by the swinging of the hopper, and means connected with the second lever for moving the lowered plunger away from the first named lever toward the end of its stroke.

6. In a machine for weighing liquids, the combination with a tank, of a two part hopper pivotally mounted therein for receiving liquid and discharging it into the tank, a pair of dash-pots having plungers projecting upwardly therefrom into position to be operated by said hopper as it swings, means connected with said dash-pot plungers for raising one when the other is lowered by the swinging of the hopper, and means for moving the lowered plunger away from said means toward the end of its stroke.

7. In a machine for weighing liquids, the combination of a pivoted two-part hopper, a pair of dash pots having plungers in position to be operated alternately by the hopper as it swings back and forth, a lever connecting said plungers and pivoted at its center, a guide on said lever parallel therewith, and a rolling weight on said guide for swinging the lower end of the lever down after it has been forced to its lowest position by the hopper, whereby the plunger operated by the hopper will be moved down beyond the limit to which it is forced by the hopper.

8. In a machine of the character described, the combination with a pivoted hopper, and a pair of dash-pots in position to be operated thereby and each having a plunger, of a lever pivoted at the center and connected with said dash pots, a track carried by said lever, a roller weight movable along said track, and a pair of pivoted stops for the weight resiliently connected together.

9. In a machine of the character described, the combination with a pivoted two-part hopper, of a lever, a pair of dash pot plungers connected with the opposite ends of said lever and each in position to be operated by the hopper as it oscillates, a pair of pins on said lever, a yoke having fingers adapted to be engaged by said pins as each one moves upwardly for lifting the yoke, and a counter operated by said yoke, whereby said counter will be operated each time either end of the lever is elevated, and means on the lever for forcing farther down the end that is depressed by the hopper to raise the other end and operate the counter.

10. In a machine of the character described, the combination with a pivoted two-part hopper, of a lever, a pair of dash-pot plungers connected with the opposite ends of said lever and each in position to be operated by the hopper as it oscillates, a pair of pins on said lever, a yoke having fingers adapted to be engaged by said pins as each one moves upwardly for lifting the yoke, and a counter operated by said yoke, whereby said counter will be operated each time either end of the lever is elevated.

In testimony whereof I have hereunto set my hand, in the presence of two subscribing witnesses.

CHARLES J. WILDER.

Witnesses:
GEORGE F. SWANN,
WM. F. LOGAN.

---

Copies of this patent may be obtained for five cents each, by addressing the "Commissioner of Patents, Washington, D. C."